United States Patent

Le Floch

[15] 3,649,930

[45] Mar. 14, 1972

[54] METHOD OF FREQUENCY-STABILIZATION OF A SINGLE-MADE GAS LASER

[72] Inventor: Albert Le Floch, 7, square du Bois Perrin, 35 Rennes, France

[22] Filed: Dec. 4, 1970

[21] Appl. No.: 95,283

[30] Foreign Application Priority Data

Dec. 12, 1969 France..............................6943193

[52] U.S. Cl. ............................................................331/94.5
[51] Int. Cl. ..............................................................H01s 3/10
[58] Field of Search..............................331/94.5; 350/160

[56] References Cited

UNITED STATES PATENTS 3,534,292 10/1970 Cutler..................................331/94.5

Primary Examiner—William L. Sikes
Attorney—Cameron, Kerkam & Sutton

[57] ABSTRACT

The method consists in applying a steady axial magnetic field to the active gaseous medium, in determining either the value of said steady magnetic field which corresponds to the laser-cavity oscillation frequency to be stabilized or the length of the laser cavity corresponding to a set value of the steady magnetic field so that the oscillation frequency should correspond to the peak value of one of the two Doppler curves obtained as a result of the Zeeman effect by splitting the Doppler curve which corresponds to a zero value of the steady magnetic field, in superimposing an alternating axial magnetic field on said steady magnetic field and causing the split Doppler curve to oscillate about a position corresponding to the selected value of the steady magnetic field in order to modulate the output light intensity of said laser, in detecting the modulated output intensity, in comparing the variations in modulation of said output intensity with those of the alternating magnetic field by means of a detector which delivers a signal so that the light-emission frequency of the laser may be corrected by said signal and by a change in length of the laser cavity.

7 Claims, 6 Drawing Figures

METHOD OF FREQUENCY-STABILIZATION OF A SINGLE-MADE GAS LASER

This invention relates to a method for stabilizing the optical frequency of the output light emission of a single-mode gas laser and to a gas laser for carrying out said method.

Many laser applications such as metrology or the study of Brillouin and Raman scattering call for a vary stable optical frequency. A number of methods have been proposed for the stabilization of gas lasers and can be placed in three main categories.

In accordance with the first method, two lasers are employed and one serves to stabilize the other. The obvious disadvantage of this method arises from the fact that the use of two lasers entails a very high capital outlay. The second method involves the use of a substance which is usually a gas contained in a tank and which exhibits saturable absorption to the laser radiation to be stabilized. The tank is placed either inside or outside the laser cavity. This method of stabilization is highly efficient but nevertheless suffers from a major drawback in that a tank is introduced on the path of the light beam. Apart from the resultant increase in overall size of the device, this is liable to give rise to undesirable reflections from the tank walls and to further difficulties of alignment. In the third method, a correction signal derived from the laser itself is employed in order to stabilize the optical frequency of the output intensity. This method provides the clearest illustration of the prior art and will be explained in detail after reference has been made to the accompanying figures.

Figure 1:
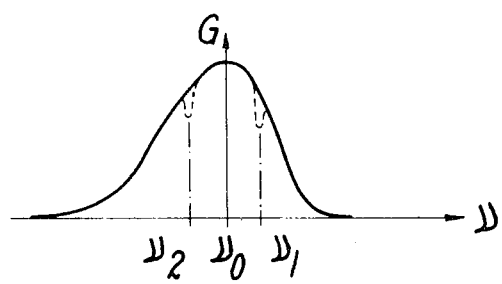
FIGS. 1 and 2 represent respectively the Doppler curve of the gain of the active medium and the output intensity as a function of the frequency in a zero magnetic field.

In accordance with the above-mentioned third method of the prior art, there is employed a phenomenon which is known by the name of "Hole burning" as introduced by Bennett in 1962 (W. R. Bennett, Phys. Rev., 126, 1962, p. 580). The gas atoms which constitute the active laser medium are endowed with motion resulting from thermal agitation. If the gain G of the light ray on which the laser emission is produced is represented as a function of its optical frequency, a bell-shaped curve (Gaussian curve) as shown in FIG. 1 is usually obtained. This curve is known as the Doppler curve or gain since it results from a Doppler effect arising from thermal agitation of the gas atoms. A standing-wave state is established within a laser cavity which is a resonant cavity, the length of said cavity being equal to a whole number of times the half-period of the standing waves. It is known that a standing wave can be split-up into two waves which have identical intensities and propagate at equal velocities but in opposite directions. Since the laser under consideration is of the single-mode type, said laser oscillates at only one frequency. The wave which propagates in one direction interacts with the atoms of the active medium which have a velocity $+v$, for example, whereas the wave which propagates in the other direction interacts with atoms having a velocity $-v$. These two waves therefore interact with atoms which have the same velocity but are of opposite direction. Population inversion of the energy levels of atoms having the velocities $\pm v$ decreases with respect to that of the other energy levels of atoms having velocities other than $v$. In fact, since the laser is of the single-mode type, the energy extracted from the active medium is taken solely from the atoms having velocities $\pm v$ which correspond to the laser emission frequency. The output intensity I of the laser which emits at an optical frequency $v$ is correspondingly higher as the gain (or population inversion) in the active medium is higher at said frequency $v$. In FIG. 1, assuming that the laser operates at the frequency $v_1$, a hollow portion will therefore be formed in the Doppler curve in respect of the frequency $v_1$ since the population inversion and therefore the gain decreases at this frequency. The light energy having a frequency $v_0$ (maximum value of the Doppler curve) is emitted by active gas atoms having zero velocity. That portion of the Doppler curve which is located at frequencies lower than $v_0$ corresponds to atoms having negative velocities (relative to the wave) whereas the other portion of the curve which is located at frequencies higher than $v_0$ corresponds to atoms having positive velocities. Since there is a standing wave within the laser cavity, that is to say two waves having the same frequency and equal intensities but opposite velocities and if one wave interacts with atoms having a velocity $+v$, the other wave will interact with atoms having a velocity $-v$. In the Doppler curve of FIG. 1, there will therefore also be a hole corresponding to an emission frequency $v_2$ which is symmetrical with $v_1$ relative to $v_0$. It is this phenomenon of appearance of two symmetrical holes in the Doppler curve which has been referred to as "Hole burning". Since this phenomenon takes place at all oscillation frequencies of the laser cavity and therefore at each point of the Doppler curve, said holes cannot be shown experimentally when the curve of output intensity I of the laser is plotted as a function of its frequency except in one case. In fact, assuming that the resonant frequency of the laser cavity is modified by changing the cavity length, for example, and that the cavity oscillates at the frequency $v_0$ corresponding to atoms of zero velocity, the two waves of opposite velocities which propagate within the laser cavity will therefore interact with the same atoms having zero velocity. In consequence, the two holes of the Doppler curve which were initially formed in respect of the frequencies $v_1$ and $v_2$ will now meet and be placed at the frequency $v_0$: instead of having a local formation of a single hole in the Doppler curve, there will therefore be formed two holes. Accordingly, it is apparent that the gain of the laser in respect of the frequency $v_0$ will have a minimum value inasmuch as the two waves which propagate within the laser cavity at equal but opposite velocities interact with the same group of atoms having zero velocity. It is this hollow portion at the peak value of the Doppler curve which has been represented in FIG. 2. The theory of this phenomenon has been given by Lamb (W. E. Lamb, Phys. Rev., 134, 'No. 6 A, 1964, p. 1,429) and this hole in the Doppler curve at the frequency $v_0$ which is observed experimentally has been referred-to as the "Lamb dip". In the Lamb theory, the variation $dE/dt$ in time of the electric field $E$ which is associated with the light wave emerging from the laser (the output intensity I of the laser being equal to $E^2$) can be written:

$$dE/dt = \alpha E - \beta E^3$$

In this expression, $\alpha$ represents the gain without saturation and $\beta$ represents a saturation term. It is understood intuitively that the presence of the "Lamb dip" is solely due to the saturation term $\beta$ since it can be stated in a simplified manner that the gaseous active medium is not capable of supplying a sufficient amount of energy at the frequency $v_0$, the number of gas atoms which have zero velocity being virtually insufficient.

The presence of the "Lamb dip" is turned to useful account for frequency stabilization of single-mode gas lasers in devices of the prior art which are the most closely related to the present invention. The method consists first in choosing as operating point of the laser the frequency $v_0$ which corresponds to the minimum value of the Lamb dip. This is achieved very precisely by judiciously selecting the value of the length of the laser cavity. Thereupon, one of the mirrors constituting the laser cavity is caused to vibrate to a very slight extent, this being tantamount to an oscillation of the optical frequency about $\nu_0$. In other words, the Lamb dip is scanned about the minimum value $\nu_0$. The output intensity of the laser is modulated as a result of the periodic variation in the resonant frequency of the cavity as produced by the vibration of one of the two mirrors. The characteristics (phase and amplitude) of said modulation are dependent on the deviation of the "mean" operating point of the laser with respect to the frequency $\nu_0$. The variations of said modulation are then compared with those of the length of the cavity with the aid of adequate means which are capable of delivering a signal for the correction of intensity which becomes greater as the frequency drift increases. This correction signal which is applied to suitable means for varying the length of the laser cavity makes it possible to correct said frequency drift. This method of effective stabilization is employed for frequency stabilization of commercially available single-mode gas lasers. However, the method has a major disadvantage which arises from its underlying principle. In fact, the correction signal is obtained by causing a slight oscillation in the resonant frequency of the laser cavity in order to scan the Lamb dip. In order to stabilize the optical frequency of the laser, it is therefore found necessary to modulate said frequency with a view to obtaining a correction signal. In practice, steps are taken to ensure that the oscillation of the optical frequency which is chosen so as to have the lowest possible frequency is compatible with the value of the ratio of correction signal to noise. Since the intensity of the correction signal is higher as the Lamb dip scanning amplitude is of greater value, said intensity is therefore limited.

The invention provides a method and a device which meet practical requirements more effectively than those of the prior art, especially insofar as the above-mentioned disadvantages no longer arise. In order to correct any possible variations in optical frequency of the light emission of the laser, the invention is primarily intended to obtain a correction signal resulting from variations in output intensity of the laser without resorting to oscillation of the length of the laser cavity. A further object of the invention is to obtain a high-amplitude correction signal without modifying the resonant frequency of the laser cavity.

To this end, the invention proposes a method of frequency stabilization of a single-mode gas laser, wherein use is made of a correction signal resulting from variations in output intensity of said laser and wherein said method consists successively:

in applying a steady axial magnetic field to the gaseous active medium, in determining the value of said steady magnetic field which corresponds to the laser-cavity oscillation frequency to be stabilized and therefore to a preestablished length of the laser cavity or conversely in determining the length of the laser cavity which corresponds to a preestablished value of said steady magnetic field so that the oscillation frequency of the laser cavity should correspond to a peak value of one of the two Doppler curves which are obtained as a result of the Zeeman effect by splitting the Doppler curve corresponding to a zero value of the steady magnetic field, that is to say in satisfying the conditions of resonance of the magnetic Lamb dip, in applying an alternating axial magnetic field which is superimposed on said steady magnetic field so that the split Doppler curve should oscillate about its position corresponding to the value of said steady magnetic field, the output light intensity of said laser being then modulated, in detecting said modulated output intensity, in comparing the variations in modulation of said output intensity with those of said alternating magnetic field by means of a detector which delivers a signal for correction of intensity which increases with the magnitude of the difference between said variations and, in correcting the frequency of the light emission of said laser if necessary by means of said correction signal and by modifying the length of said laser cavity.

The invention also proposes a frequency-stabilized single-mode laser for carrying out said method and comprising a gaseous active medium contained in an envelope and located between two mirrors forming a Fabry-Perot resonant cavity, means for exciting said gaseous medium so as to produce a population inversion, means for producing within said active medium an adjustable steady axial magnetic field and an adjustable alternating axial magnetic field, a detector for detecting the light intensity emitted by said laser, means for comparing the variations in said light intensity with the variations in said alternating magnetic field, said comparison means being such as to deliver a correction signal, and means for varying the length of said laser cavity which are controlled by said correction signal.

A clearer understanding of the invention will be obtained from the following description of one mode of execution of the invention which is given by way of example without any limitation being implied, reference being made to FIGS. 3 to 6 of the accompanying drawings.

When a steady magnetic field is applied to the medium, it is found that, in a direction of observation of the medium which corresponds to the direction of the steady magnetic field, the energy levels of the atoms of said medium are split into two $j+1$ sub-levels.

Figure 3:
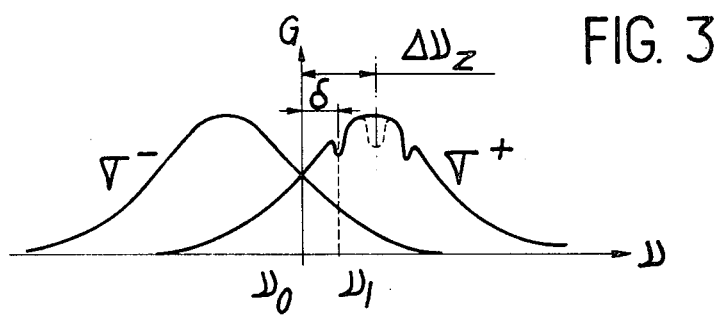
FIG. 3 represents the Doppler curves obtained by causing a continuous axial magnetic field to act on the active laser medium (the diagram corresponds to a transition $J=1 \rightarrow J=0$; the splitting in the case of a line $J=1 \rightarrow J=2$ is equivalent as a first approximation if the Landé g-factors are closely related).

This is the Zeeman effect. Starting from a given energy level ($J=1$), there are therefore obtained three Zeeman sub-levels. The difference $\Delta\nu_z$ between two Zeeman sub-levels is given by the relation :

$$\Delta\nu_z = g \beta H$$

in which $g$ represents a number which is referred to as the splitting factor or Landé g-factor and which has a different value in respect of each level considered, $\beta$ is the value of the Bohr magneton and $H$ represents the intensity of the steady magnetic field which is applied to the medium. In the case of a predetermined energy level, the difference between two Zeeman sub-levels is therefore proportional to the value of the applied magnetic field. The Doppler curve which represents the gain as a function of the emission frequency $\nu$ will therefore be split into two curves $\sigma^-$ and $\sigma^+$ each corresponding to one Zeeman sub-level. These two Doppler curves which are shown in FIG. 3 are symmetrical with respect to the initial frequency $\nu_0$ of the laser emission. Let it now be assumed that a steady axial magnetic field produces action on the laser active medium and that the resonant frequency $\nu_1$ of the laser cavity is displaced uniformly by progressively varying the length of the laser cavity; and if $\delta$ represents the deviation of the resonant frequency $\nu_1$ of the cavity with respect to the central frequency $\nu_0 (\delta = \nu_1 - \nu_0)$, a resonance effect is observed in agreement with the conventional Lamb theory when we have the equality:

$$\delta = \Delta\nu_z$$

Figure 2:
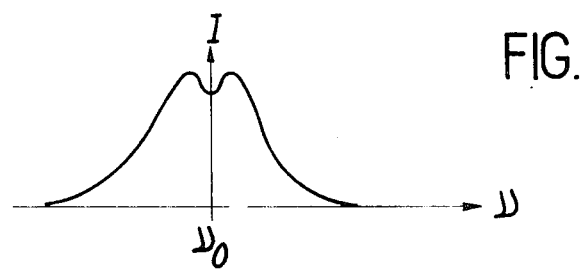

When this condition is satisfied, there is accordingly observed a superimposition of the two holes in the split Doppler curve, for example in the case of the component $\sigma^+$ in FIG. 3 and consequently a hole in the output intensity of the laser which corresponds to the conventional Lamb dip of FIG. 2. It is evidently possible to set a value $\delta$ and to observe a hole in the output intensity in the case of the same condition $\delta = \Delta\nu_z$, not by varying $\delta$ but by varying the steady magnetic field. By analogy, said hole in the curve of the output intensity in the presence of a magnetic field is referred to as a "magnetic Lamb dip".

Figure 4:
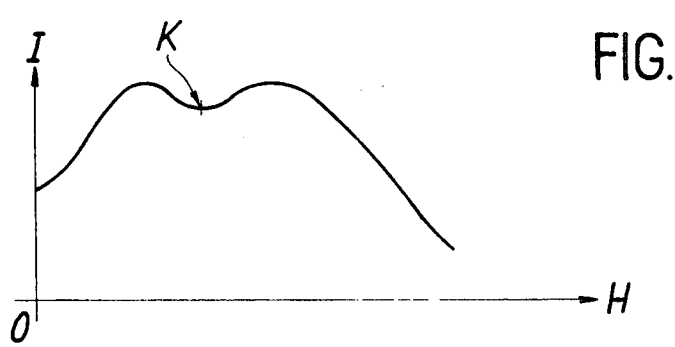
FIG. 4 is a curve showing the variations in the output intensity I of the laser as a function of the value of the axial steady magnetic field H which acts on the active laser medium in respect of a constant oscillation frequency of the cavity.

Experimentally, the magnetic Lamb dip can be clearly shown by plotting the curve representing the output intensity I of the laser as a function of the value of the steady magnetic field H applied to the active laser medium in respect of a given value of $\delta$ (approximately 150 mc./sec. in the case of FIG. 4). On this curve, the magnetic Lamb dip appears in the form of a hollow portion as indicated by the point K in FIG. 4. It is readily understood that this curve in fact corresponds to a single-mode laser and to a constant length of the laser cavity.

The method for stabilizing the optical frequency of a single-mode gas laser consists in accordance with the present invention in applying in a first step a steady axial magnetic field to the active medium in order to split the initial Doppler curve into two components $\sigma^-$ and $\sigma^+$. The value of the steady magnetic field and therefore $\Delta\nu_z$ is established. Thereupon, by progressively varying the oscillation frequency $\nu_1$ of the laser cavity, that is to say in practice by progressively modifying its length, the condition of observation of the resonance of the magnetic Lamb dip is satisfied in respect of:

$$\delta = \Delta\nu_z$$

In this first step, it is evidently possible to carry out the operation in reverse, that is to say to allow the length of the laser cavity to remain constant, therefore to set initially the value of $\delta$ and to cause a variation in the value of the steady magnetic field H, consequently in the value of $\Delta\nu_z$, in order to obtain the equality $\delta = \Delta\nu_z$. In the case of the curve of FIG. 4, this means that the operating point of the laser corresponds to the point K.

In a second step, an alternating axial magnetic field applied to the active laser medium is superimposed on the steady magnetic field. Under the action of said alternating magnetic field, the components $\sigma^+$ and $\sigma^-$ of the split Doppler curve oscillate to a slight extent about their positions as determined by the value of the steady magnetic field H. Instead of scanning the Lamb dip by slightly modulating the value of the oscillation frequency of the cavity laser as was the practice in devices of the prior art, the oscillation frequency of the laser cavity is allowed in this case to remain constant and the positions of the Doppler curve components are caused to oscillate to a slight extent. In the case of the curve of FIG. 4, the output intensity of the laser will therefore have the same period of oscillation about the point K as that of the alternating magnetic field. In consequence, the output intensity of the laser is modulated.

Figure 5:
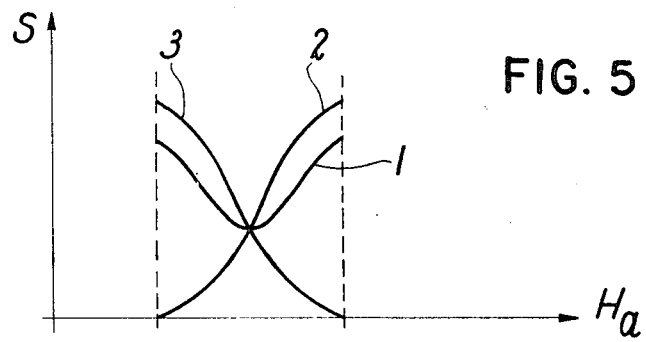
FIG. 5 represents the intensity S of the correction signal as a function of the value of the axial alternating magnetic field $H_a$ which is superimposed on the constant or steady field in respect of three resonant frequencies of the laser cavity (curves 1, 2, 3).

In a third step, a detector is employed in order to compare the variations in the modulation of the output intensity with the variations in the alternating magnetic field. Said detector delivers a correction signal whose intensity S increases with the magnitude of the difference between the variations in the alternating magnetic field and the output intensity of the laser. The intensity S of said correction signal also depends on the amplitude of the alternating magnetic field $H_a$ which is applied. In FIG. 5 which represents the intensity S of the correction signal as a function of the value of the alternating magnetic field $H_a$, curve 1 indicates that the resonance condition $\delta = \Delta\nu_z$ is fulfilled and that the operating point of the laser is located precisely at point K of FIG. 4 whereas, in the case of curves 2 and 3, the operating point is located on the portions respectively to the right and to the left of the point K. The correction signal is then applied to means for slightly modifying the length of the laser cavity and therefore for modifying the value of the parameter $\delta$, thereby restoring if necessary the conditions of resonance of the magnetic Lamb dip (point K of FIG. 4).

The main advantage of this method of stabilization lies in the fact that no action is produced on the frequency to be stabilized. A further advantage is the increase in intensity S of the correction signal which is achieved solely by modifying the amplitude of the alternating magnetic field without modifying the frequency to be stabilized. The ratio of correction signal to noise can thus be very high, which was not possible in methods of the prior art which made use of the conventional Lamb dip. Moreover, since the value of the parameter $\Delta\nu_z$ which corresponds to the half-difference between two Zeeman sublevels is directly proportional to the value of the steady magnetic field H, the oscillation frequency of the laser which corresponds to the magnetic Lamb-dip resonance depends solely on the value of said steady magnetic field. In consequence, the frequency to be stabilized is adjustable. However, it is necessary to ensure that the selected value of the parameter $\Delta\nu_z$ is located in a zone such that the magnetic Lamb dip remains sufficiently well defined. This zone can be evaluated at a few hundred mc./sec. in the case of an He-Ne gas laser. By way of indication, the width of the Doppler curve in the case of the same type of laser is in the vicinity of 1,500 mc./sec. and the value of $\delta$ can be set, for example, at 150 mc./sec.

Figure 6:
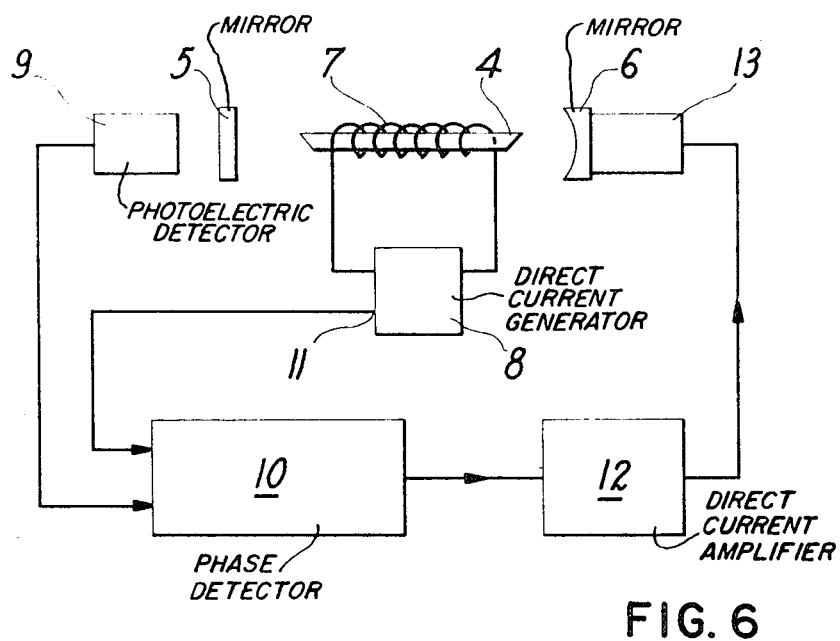
FIG. 6 represents an advantageous embodiment of the invention.

FIG. 6 is a diagram showing one advantageous embodiment of a frequency-stabilized single-mode gas laser which serves to carry out said method. The laser is constituted by an active gaseous medium contained in an envelope 4 and located between two mirrors 5 and 6 which form a Fabry-Perot resonant cavity. The envelope 4 is a glass tube which is closed at both ends by two windows placed at the Brewster angle of incidence. The mirror 5 is a plane mirror with practically total reflection whereas the mirror 6 is spherical and semi-relfecting. A solenoid 7 which surrounds the envelope 4 is connected to a modulated direct-current generator 8. The passage of said current through the solenoid produces within the interior of the envelope 4 and along the optical axis of the laser a magnetic field which can be split into of 70 gauss and steady magnetic field H and an alternating magnetic field $H_a$ which are superimposed and in the same direction. The intensity of the direct current which is delivered by the generator 8 and the amplitude of modulation of said current are adjustable so that the density of the steady magnetic field H and the amplitude of the alternating magnetic field $H_a$ can vary. A photoelectric detector 9 detects the output light of the laser and is connected to one of the two input terminals of a phase detector 10. The other input terminal of said phase detector is connected to an output 11 of the generator 8. The detector 10 carries out synchronous detection of variations in phase and in amplitude of the modulation of the laser output intensity with respect to the variations in the alternating magnetic field $H_a$ and delivers a correction signal having an intensity which can increase, for example, with the difference between said variations. Said correction signal is amplified by means of a direct-current amplifier 12 and is then applied to the input of a piezoelectric ceramic element 13. Said ceramic element 13 is bonded to the rear face of the mirror 6; the vibrations of said element are thus transmitted to said mirror 6 and make it possible in a convenient manner to modify the length of the laser cavity and therefore the resonant frequency of said cavity. The values of the steady and alternating magnetic fields are respectively of the order of 70 gauss and 7 gauss. Since the stability of the output frequency of the laser depends on the stability of the value of the steady magnetic field H, said value must therefore be highly stable.

This invention is not limited solely to the embodiment which has been described by way of example with reference to the accompanying drawings. In particular, the synchronous detection which is carried out by means of the detector 10 can be carried out with the aid of other suitable means. The piezoelectric ceramic element 13 provides a convenient means of modifying the length of the laser cavity to a very slight extent and therefore of correcting the output optical frequency of the laser but it is wholly apparent that alternative devices can be employed. The steady and alternating magnetic fields have been produced by means of a solenoid connected to a current generator 8 but it is wholly evident that these magnetic fields may be produced by other methods.

We claim

1. A method of frequency-stabilization of a single-mode gas laser, wherein use is made of a correction signal resulting from variations in output intensity of said laser and said method consists successively:

in applying a steady axial magnetic field to the gaseous active medium;

in determining the value of said steady magnetic field which corresponds to the laser-cavity oscillation frequency to be stabilized and therefore to a pre-established length of the laser cavity and conversely in determining the length of the laser cavity which corresponds to a pre-established value of said steady magnetic field so that the oscillation frequency of the laser cavity should correspond to a peak value of one of the two Doppler curves $\sigma^+$ and $\sigma^-$ which are obtained as a result of the Zeeman effect by splitting the Doppler curve corresponding to a zero value of the steady magnetic field or in other words in satisfying the resonance conditions of the magnetic "Lamb dip";

in applying an alternating axial magnetic field which is superimposed on said steady magnetic field so that the split Doppler curve should oscillate about its position corresponding to the selected value of said steady magnetic field, the output light intensity of said laser being then modulated;

in detecting said modulated output intensity;

in comparing the variations in modulation of said output intensity with those of the alternating magnetic field by means of a detector which delivers a correction signal and, in correcting the frequency of the light emission of said laser if necessary by means of said correction signal and by modifying the length of said laser cavity.

2. A method according to claim 1 such that the optical laser emission frequency to be stabilized is adjusted by modifying the value of said steady magnetic field.

3. A frequency-stabilized laser comprising a gaseous active medium contained in an envelope and located between two mirrors forming a Fabry-Perot resonant cavity, means for exciting said gaseous medium in order to cause a population inversion, means for producing within said active medium an adjustable steady axial magnetic field and an adjustable alternating axial magnetic field, a detector for detecting the light intensity emitted by said laser, means for comparing the variations in said light intensity with the variations in said alternating magnetic field, said comparison means being such as to deliver a correction signal, and means for varying the length of said laser cavity which are controlled by said correction signal.

4. A laser according to claim 3 said means for producing said magnetic fields comprising a solenoid which surrounds said gaseous medium and a modulated direct-current generator, the intensity and modulation of said current being adjustable and the input and output terminals of said generator being connected to the ends of said solenoid.

5. A laser according to claim 3 said light intensity detector being a photoelectric detector.

6. A laser according to claim 3 said comparison means comprising a phase detector.

7. A laser according to claim 3 said means for varying the length of said laser cavity comprising a piezoelectric ceramic element which is bonded to one of said two mirrors.

* * * * *